United States Patent Office 3,169,936
Patented Feb. 16, 1965

3,169,936
EPOXY RESIN ADHESIVE COMPOSITIONS
Walter B. Armour, Plainfield, N.J., and Michael P. Diamantopoulos, South Acton, Mass., assignors to National Starch and Chemical Corporation, New York, N.Y., a corporation of Delaware
No Drawing. Filed Nov. 23, 1962, Ser. No. 239,808
14 Claims. (Cl. 260—29.7)

This invention relates to novel resin compositions, to a method for their preparation, and to the films and coatings derived therefrom.

Epoxy resins are known to possess a number of properties which make them suitable for use in the preparation of adhesives, laminates, coatings, and similar applications. Many epoxy resin systems can be processed or cured at room temperature or at slightly elevated temperatures. In addition, cured epoxy resin films have excellent strength, heat resistance, and resistance to common organic solvents. However, a serious shortcoming shown by all epoxy resins is their lack of tenacious dry film tack, i.e., that property which allows a substrate coated with an adhesive to be immediately adhered to another substrate upon the application of pressure. Because of this aforementioned failing of epoxy resins, their use is precluded in many assembly line manufacturing processes, wherein rapid bonding of dry adhesive films is desirable, e.g., in processes requiring the application of pressure to mating adhesive coated substrates.

Epoxy resins are commonly synthesized in commercial practice by the condensation of an epichlorohydrin or polyepoxide with polyhydric phenols such as bis(4-hydroxyphenol) dimethyl methane, or, as it is commonly called, "bisphenol A." For example, when epichlorohydrin and bisphenol A are condensed, an epoxy resin of the following structure is obtained:

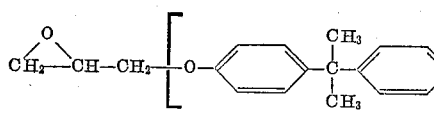 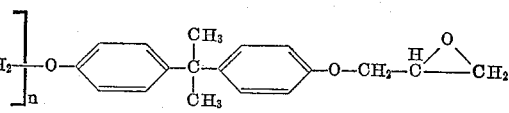

Since the type of condensation product represented by the above formula possesses only terminal epoxy groups, it has only limited functionality and cross-linking ability. Recently, certain polymers have been chemically modified to impart conventional epoxy resin properties thereto. Thus, for example, polybutadiene has been treated with lower aliphatic peracids, resulting in polymers having both internal and terminal epoxy groups.

Attempts have been made to obtain epoxy resin based compositions which provide films and coatings that exhibit satisfactory dry tack properties. Such attempts, however, have heretofore met with little success, primarily because of the poor compatibility displayed by the various components of the resulting adhesive compositions. Moreover, the rather high cost of the various components of these adhesives, as well as the poor quality of the bonds generally obtained with these formulations, constitute additional obstacles to the preparation of acceptable epoxy resin based contact adhesives.

It is an object of this invention to provide epoxidized polybutadiene-based compositions which are capable of functioning as contact adhesives. Other objects and the advantages of this invention will be apparent from the discussion that appears hereinafter.

In accordance with the invention, an epoxidized polybutadiene resin containing ethylenic unsaturation and having both terminal and internal epoxy groups is blended with novel chlorinated polymer mixtures which are prepared from a mixture of atactic polypropylene and an ethylene:propylene copolymer. These blends may also contain a curing agent and may be cured at room or elevated temperatures. The resinous compositions of our invention display remarkable contact bonding properties and form high strength adhesive bonds which are resistant to both heat and organic solvents. The inclusion of the chlorinated polymer mixtures in our compositions imparts fire resistance thereto and also provides a surprising improvement in the degree of adhesion displayed between the films and coatings of these compositions and a wide variety of substrates, including metals, plastics, and the like.

As was noted above, the epoxidized polybutadiene resins which are used to formulate the compositions of our invention must possess internal, as well as terminal, epoxy groups. These resins must have a minimum molecular weight of about 138 and a maximum molecular weight such that the solubility in applicable solvents is maintained to a degree of at least 5% by weight of the resin. The epoxidized polybutadiene resins applicable for use in the process of our invention are prepared by treating a polybutadiene with a lower aliphatic peracid having from 1 to 10 carbon atoms in a manner similar to that set forth in U.S. Patent 2,921,921. The peracids utilized may be synthesized before the reaction or they may be formed in situ in the actual reaction mixture.

The chlorinated polymer mixtures which are used to prepare the contact adhesives of this invention are prepared by blending atactic polypropylene and ethylene:propylene copolymers in the form of an organic solvent solution which is then chlorinated in the presence of a suitable free radical initiator. In the actual preparation of these polymer mixtures, separate solutions of atactic polypropylene and of an ethylene:propylene copolymer are blended and thereafter subjected to a chlorination procedure in the presence of a free radical catalyst or initiator. The chlorine may be introduced by bubbling chlorine gas directly into the reaction mixture or by refluxing the latter in the presence of sulfuryl chloride, or by any of the conventional chlorination methods, such as treatment with thionyl chloride or treatment with phosphorous pentachloride. The free radical initiators or catalysts are usually solvent soluble organic peroxides such as benzoyl or lauroyl peroxide.

A typical procedure for the preparation of these chlorinated polymer mixtures involves the initial formulation of organic solvent solutions of the atactic polypropylene and of the ethylene:propylene copolymer, with the process of solution being assisted by refluxing and agitation of the mixture. The solvents which are used to dissolve the components of the reaction mixture, viz., the atactic polypropylene and the ethylene:propylene copolymers, must not be susceptible to chlorination. The solvents most commonly employed in our invention include carbon tetrachloride, methylene chloride, dichloroethane, tetrachloroethane, chloroform, and similar materials. The resulting solutions are then agitated and heated to reflux. While the thus prepared solutions are being maintained at constant reflux, the free radical catalyst is added and soon dissolves in the mixture. Sulfuryl chloride is then slowly added. The mixtures are maintained at reflux for periods of time ranging from 5 to 10 hours, thereby yielding the chlorinated polymer mixtures compositions used in our invention. Additional details relating to the preparation of our chlorinated polymer mixtures are set forth in a copending patent application entitled "Polyolefin Interpolymers," Serial No. 214,519, filed August 3, 1962, and assigned to the assignee of the subject application.

For use in the preparation of the adhesive compositions of this invention, the chlorinated polymer mixtures may contain from about 5% to about 65%, by weight, of chlorine. The polymer mixtures should also have a ratio of atactic polypropylene to the ethylene:propylene copolymer ranging from 30:70 to 70:30. Moreover, the ethylene:propylene copolymer used to prepare the polymer mixtures should have a Mooney viscosity ranging from 20 to 90 and a ratio of ethylene:propylene ranging from 35:65 to 70:30, by weight. The free radical initiator or catalyst is employed in a concentration of from 0.1% to 1.0%, by weight, as based on the total weight of the polymer blend which is being reacted.

As was mentioned previously, curing agents may be employed in formulating the systems of our invention. These curing agents may be classified as two groupings, true catalysts and hardeners. True catalysts are those curing agents which initiate a direct linkage between the epoxy groups of the epoxidized polybutadiene. Among the true catalysts applicable for use in our compositions may be included tertiary amines, Lewis acids, Lewis acid salts, and the like. Hardeners, on the other hand, are those curing agents which actually react with the epoxy groups of the epoxidized polybutadiene to form crosslinked polymers. Among such materials may be included primary and secondary amines, dibasic organic acid anhydrides, polyphenols, and the like. We have obtained particularly favorable results by using curing agents such as chlorendic anhydride, polymaleic acid, trimellitic anhydride, maleic anhydride, 3-diethyl aminopropylamine, dibenzyl methylamine, boron trifluoride monoethylamine and pyromellitic dianhydride.

In the preparation of the composition of our invention, the epoxidized polybutadiene and the chlorinated polymer mixtures are generally admixed by being dissolved or dispersed in an organic solvent. Where curing agents are utilized, they may be added to the resulting solutions just prior to the time these formulations are to be used. Our adhesives may be utilized in the form of the lacquers wherein they are prepared, or these lacquers may, in turn, be converted to aqueous emulsions prior to their use. Thus, our adhesive lacquers may be readily emulsified by adding an aqueous solution of an emulsifier, such as polyvinyl alcohol, morpholine-oleic acid mixtures, and the like, to the lacquer while the lacquer is being vigorously agitated. It should also be noted that the compositions of our invention possess the advantage that they may be formulated with inexpensive hydrocarbon solvents, such as pentane and hexane. The total solids content of our formulations may range from about 10% to about 65% by weight.

The ratio of the amount of the epoxidized polybutadiene to that of the chlorinated polymer mixtures in the adhesive formulations of our invention may range from about 55:45 to about 15:85. Catalysts are usually employed in a concentration of from about 1 to 10 parts of catalyst per 100 parts of the epoxidized polybutadiene; whereas, when hardeners are used, they may be present in amounts ranging from about 10 to 100 parts of hardeners per 100 parts of the epoxy resin. In addition to the constituents of our systems previously described, other additives may also be incorporated therein. Thus, fillers, tackifiers, antioxidants, and similar additives may be employed in our formulations.

Coatings and films may be prepared from our compositions by any suitable means, such as casting, spraying, dipping, brushing, and the like. These films will ordinarily be applied in wet coating thicknesses of from about 0.5 to about 10 mils.

The films and coatings derived from our epoxy-polymer mixtures blends may be cured by being subjected to temperatures ranging from room temperature up to temperatures of about 400° F. It should be noted that when temperatures above 375° F. are employed, there is no need for including a curing agent in the formulations of our invention.

By combining epoxidized polybutadiene resin with our chlorinated polymer mixtures, the process of our invention thereby enables formulations to be attained that exhibit a number of useful properties. Thus, the combination of polymer mixtures and epoxidized polybutadiene resin in our formulations imparts flexibility to the films and coatings cast therefrom and also enables adhesive bonds to be formed on immediate contact with a variety of substrates. Moreover, this combination imparts remarkable strength, hardness, and solvent resistance to films derived therefrom. In addition, the ease with which the compositions of our invention may be utilized is further enhanced by the ability of their films and coatings to be cured at room temperature or at slightly elevated temperatures. When used as adhesives, our formulations are effective in bonding impervious materials which are normally difficult to bond. These compositions may be employed to bond a variety of substrates, including aluminum, steel, wood, and plastic films and sheets such as those derived from polyethylene terephthalate, polystyrene, rubber hydrochloride, polyethylene, polypropylene, polyvinyl chloride, and polyvinylidene chloride.

In the following examples, which further illustrate the embodiment of this invention, all parts given are by weight unless otherwise indicated.

Example 1

In this example, and in the examples that follow, the same basic procedure was employed. In following this procedure, the epoxidized polybutadiene resin and the chlorinated polymer mixtures were dissolved in a suitable solvent and the solutions were admixed. In those cases where a curing agent was utilized, the agent was added to the solutions just prior to the time the formulation was to be used. The resulting formulations were then employed to cast films, coatings, and similar products, and, in some instances, were used as adhesives to bond various substrates.

The epoxidized polybutadienes that were utilized in the examples that follow hereinafter were of two types, designated respectively as (a) and (b). The properties of these epoxidized polybutadienes are as follows:

| Epoxidized Polybutadiene | Viscosity at 25° C. (poises) | Percent Epoxy Groups (by weight) | Iodine # | Percent Hydroxy Groups (by weight) |
| --- | --- | --- | --- | --- |
| (a) | 1,800 | 9 | 185 | 2.5 |
| (b) | 160 | 11 | 154 | 2.0 |

The chlorinated polymer mixtures that were utilized in the examples that follow hereinafter are designated respectively as (a) to (i). The compositions of these polymer mixtures are as follows:

| Polymer Mixture | Ethylene:propylene Copolymer | | | Parts of Atactic Polypropylene | Percent Chlorine in Polymer Mixture |
| --- | --- | --- | --- | --- | --- |
| | Parts | Mooney Viscosity | Ethylene:propylene Ratio | | |
| (a) | 50 | 90 | 45:55 | 50 | 30.0 |
| (b) | 70 | 20 | 60:40 | 30 | 61.2 |
| (c) | 50 | 30 | 60:40 | 50 | 50.7 |
| (d) | 30 | 50 | 60:40 | 70 | 59.6 |
| (e) | 50 | 50 | 70:30 | 50 | 31.9 |
| (f) | 70 | 20 | 67:33 | 30 | 58.3 |
| (g) | 50 | 30 | 67:33 | 50 | 47.7 |
| (h) | 30 | 60 | 67:33 | 70 | 61.2 |
| (i) | 50 | 30 | 60:40 | 50 | 28.2 |

The epoxidized polybutadienes and the chlorinated polymer mixtures set forth above were employed to prepare the following formulations:

| Components | Formulation # | | | | | | | |
|---|---|---|---|---|---|---|---|---|
| | 1 | 2 | 3 | 4 | 5 | 6 | 7 | 8 |
| Expoxidized polybutadiene (b) | 25 | 25 | 25 | 25 | 25 | 25 | 25 | 25 |
| Chlorinated polymer mixtures: | | | | | | | | |
| (b) | 75 | | | | | | | |
| (c) | | 75 | | | | | | |
| (d) | | | 75 | | | | | |
| (e) | | | | 75 | | | | |
| (f) | | | | | 75 | | | |
| (g) | | | | | | 75 | | |
| (h) | | | | | | | 75 | |
| (i) | | | | | | | | 75 |
| Toluene | 300 | 300 | 300 | 300 | 300 | 300 | 300 | 300 |

To each of the above formulations were added 0.5 part of chlorendic anhydride for each part of the epoxidized polybutadiene, the anhydride being added in the form of a 30%, by weight, methyl ethyl ketone solution.

The resulting compositions, when used to cast films on various surfaces, yielded films that exhibited good flexibility, strength, and contact bonding properties. In order to test the adhesive strength of these films, each formulation was applied to the mating surfaces of a sheet of plywood and a polyvinyl chloride film. These coated surfaces were dried for 2 minutes at 250° F. and were then pressed together, immediately yielding a firm bond. In contrast, when the chlorinated polymer mixtures were omitted from these adhesive formulations, there was a complete absence of bonding between the contacted surfaces.

*Example II*

Formulations of the compositions represented in the table set forth below were used to cast films on various surfaces.

| Component | Formulation # | | | | | | |
|---|---|---|---|---|---|---|---|
| | 1 | 2 | 3 | 4 | 5 | 6 | 7 |
| Chlorinated polymer mixtures (b) | 60 | 60 | 60 | 60 | 60 | 60 | 60 |
| Epoxidized polybutadiene (a) | 40 | 40 | 40 | 40 | 40 | 40 | 40 |
| Toluene | 150 | 150 | 150 | 150 | 150 | 150 | 150 |
| Methyl ethyl ketone | 150 | 150 | 150 | 150 | 150 | 150 | 150 |
| Chlorendic anhydride | 32 | | | | | | |
| Pyromellitic dianhydride | | 32 | | | | | |
| Trimellitic anhydride | | | 32 | | | | |
| Maleic anhydride | | | | 32 | | | |
| 3-diethyl aminopropylamine | | | | | 24 | | |
| Dibenzyl methylamine | | | | | | 16 | |
| Boron trifluoride monoethylamine | | | | | | | 16 |

Films cast from the above described formulations exhibited good contact bonding properties, and, after curing, exhibited outstanding strength and resistance to heat and organic solvents.

*Example III*

Formulations of the compositions represented in the table set forth below were used to cast films on various surfaces.

| Component | Formulation # | | | |
|---|---|---|---|---|
| | 1 | 2 | 3 | 4 |
| Chlorinated polymer mixtures (g) | 85 | 85 | 85 | 85 |
| Epoxidized polybutadiene (a) | 15 | 15 | 15 | 15 |
| Hexane | 150 | 150 | 150 | 150 |
| Acetone | 150 | | | |
| Ethyl acetate | | 150 | | |
| Methyl ethyl ketone | | | 150 | |
| Methyl isobutyl ketone | | | | 150 |

Films cast from the above described formulations exhibited good contact bonding properties, and, after curing, exhibited outstanding strength and resistance to heat and organic solvents.

*Example IV*

This example illustrates the preparation of the adhesives of our invention in the form of an aqueous emulsion. To a formulation comprising 70 parts of chlorinated polymer mixtures-(d), 30 parts of epoxidized polybutadiene-(a), and 200 parts of toluene and 9 parts of morpholine were added 12 parts of a polyamine catalyst (viscosity=500 centipoises; amine number=377). The resulting formulation was then added, with vigorous agitation, to a mixture of 300 parts of water and 9 parts of oleic acid, thereby yielding an emulsion which, when used to cast films on various substrates, exhibited good contact bonding properties, and which, after curing, exhibited outstanding strength and resistance to heat and organic solvents.

*Example V*

Formulations of the compositions represented in the table set forth below were used to cast films on various surfaces.

| Component | Formulation # | | | | |
|---|---|---|---|---|---|
| | 1 | 2 | 3 | 4 | 5 |
| Chlorinated polymer mixtures (a) | 10 | 55 | 65 | 75 | 85 |
| Epoxidized polybutadiene (a) | 10 | 45 | 35 | 25 | 15 |
| Toluene | 35 | 300 | 300 | 300 | 300 |
| Methyl ethyl ketone | 40 | | | | |
| Chlorendic anhydride | 5 | 22.5 | 17.5 | 12.5 | 7.5 |

Films cast from the above described formulations exhibited good contact bonding properties, and, after curing, exhibited outstanding strength and resistance to heat and organic solvents.

Any departure from the above description which conforms to the present invention is intended to be included within the scope of the invention as defined by the following claims.

We claim:

1. An adhesive composition which comprises a mixture of (a) an epoxidized polybutadiene resin having both terminal and internal epoxy groups and (b) a chlorinated polymer mixture of atactic polypropylene and an ethylene:propylene copolymer.

2. The composition of claim 1 wherein said mixture is in the form of an organic solvent solution.

3. The composition of claim 1 wherein said mixture is in the form of an aqueous emulsion.

4. The composition of claim 1 wherein the ratio of said epoxidized polybutadiene to said chlorinated polymer mixture ranges from 55:45 to 15:85.

5. The composition of claim 1 wherein said epoxidized polybutadiene resin has a minimum molecular weight of 138.

6. The composition of claim 1 wherein the amount of chlorine in said chlorinated polymer mixture ranges from 5% to 65%, by weight, of the polymer mixture, and wherein said chlorinated polymer mixture has a ratio of atactic polypropylene to the ethylene:propylene copolymer of from 30:70 to 70:30.

7. The composition of claim 1 wherein said ethylene:propylene copolymer has a Mooney viscosity ranging from 20 to 90 and a ratio of ethylene-propylene ranging from 35:65 to 70:30.

8. An adhesive composition which comprises a mixture of (a) an epoxidized polybutadiene resin having both terminal and internal epoxy groups and (b) a chlorinated polymer mixture prepared by chlorinating an organic solvent solution of a mixture of atactic polypropylene and an ethylene:propylene copolymer, said chlorination being conducted in the presence of a free radical catalyst.

9. An adhesive composition which comprises a mixture of (a) an epoxidized polybutadiene resin having both terminal and internal epoxy groups, (b) a chlorinated polymer mixture of atactic polypropylene and an ethylene:propylene copolymer, and (c) a curing agent for said epoxidized polybutadiene resin.

10. The composition of claim 9 wherein said mixture is in the form of an organic solvent solution.

11. The composition of claim 9 wherein said mixture is in the form of an aqueous emulsion.

12. The composition of claim 9 wherein the ratio of said epoxidized polybutadiene to said chlorinated polymer mixture ranges from 55:45 to 15:85 and said curing agent is present in amounts varying from 1 to 100 parts, per 100 parts of said epoxidized polybutadiene resin.

13. A film comprising the dried, consolidated residue of a mixture of (a) an epoxidized polybutadiene resin having both terminal and internal epoxy groups and (b) a chlorinated polymer mixture of atactic polypropylene and an ethylene:propylene copolymer.

14. A substrate coated with a film comprising the dried, consolidated residue of a mixture of (a) an epoxidized polybutadiene resin having both terminal and internal epoxy groups and (b) a chlorinated polymer mixture of atactic polypropylene and an ethylene:propylene copolymer.

References Cited by the Examiner
UNITED STATES PATENTS

| 2,748,105 | 5/56 | Becker et al. | 260—96 |
| 2,842,513 | 7/58 | Fitzgerald et al. | 260—836 |
| 2,849,431 | 8/58 | Baxter | 260—96 |
| 2,921,921 | 1/60 | Greenspan et al. | 260—94.7 |
| 2,924,559 | 2/60 | Safford et al. | 260—889 |
| 3,062,795 | 11/62 | Cain et al. | 260—96 |

FOREIGN PATENTS 586,442  12/58  Italy.

MURRAY TILLMAN, *Primary Examiner.*
WILLIAM H. SHORT, *Examiner.*